(12) United States Patent
Lee

(10) Patent No.: US 11,745,580 B2
(45) Date of Patent: Sep. 5, 2023

(54) COOLING SYSTEM AND METHOD FOR HYBRID ELECTRIC VEHICLE

(71) Applicants: HYUNDAI MOTOR COMPANY, Seoul (KR); KIA MOTORS CORPORATION, Seoul (KR)

(72) Inventor: Young Jun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 303 days.

(21) Appl. No.: 17/029,492

(22) Filed: Sep. 23, 2020

(65) Prior Publication Data

US 2021/0387522 A1 Dec. 16, 2021

(30) Foreign Application Priority Data

Jun. 10, 2020 (KR) .......................... 10-2020-0070348

(51) Int. Cl.
*B60K 11/02* (2006.01)
*B60K 6/22* (2007.10)
(Continued)

(52) U.S. Cl.
CPC ................ *B60K 11/02* (2013.01); *B60K 6/22* (2013.01); *F16N 17/02* (2013.01); *B60K 6/46* (2013.01);
(Continued)

(58) Field of Classification Search
CPC .......... B60K 11/02; B60K 11/00; B60K 6/22; B60K 6/24; B60K 6/00; B60K 6/46; B60K 6/442; B60K 6/387; B60K 6/48; B60K 6/547; B60K 6/26; B60K 6/38; B60K 2001/006; B60K 2001/003; B60Y 2200/92; F16N 17/02; F16N 17/00; F16N 2250/08; F16N 2270/20; B60W 2510/0291; B60W 2510/087; B60W 2510/107; B60W 2510/02; B60W 2510/081; B60W 2510/10; B60W 10/30; B60W 10/02; B60W 10/08; F01P 7/16; F01P 7/00; F01P 7/14;
(Continued)

(56) References Cited

U.S. PATENT DOCUMENTS 6,053,842 A * 4/2000 Kitada .................. B60W 10/02
903/945
6,799,109 B2 * 9/2004 Nakamori ............... F16H 61/20
903/903

(Continued)

*Primary Examiner* — James M Dolak
(74) *Attorney, Agent, or Firm* — McDonnell Boehnen Hulbert & Berghoff LLP

(57) ABSTRACT

The present disclosure relates to a cooling system and method of a HEV for cooling an engine clutch and a motor in a HEV, and includes an EOP for pumping oil from an oil pan, a flow regulating valve for adjusting a coolant amount supplied to an engine clutch and a motor in the EOP, and a controller that determines whether to adjust a coolant amount based on a temperature of the engine clutch and a temperature of the motor, accelerates a motor of the EOP based on at least one of an ATF temperature, an engine clutch temperature, a motor temperature, or a TMM control mode, and controls the flow regulating valve depending on a motor speed of the EOP to adjust the coolant amount supplied to from the EOP the engine clutch and the motor.

10 Claims, 7 Drawing Sheets

(51) Int. Cl.
*F16N 17/02* (2006.01)
*B60K 6/46* (2007.10)

(52) U.S. Cl.
CPC ....... *B60Y 2200/92* (2013.01); *F16N 2250/08* (2013.01); *F16N 2270/20* (2013.01)

(58) Field of Classification Search
CPC .. F01P 2007/146; F01P 2050/24; F01M 1/02; F01M 1/16; F01M 1/00; F01M 2001/0215; F01M 5/005; F01M 5/00
See application file for complete search history.

(56) References Cited

U.S. PATENT DOCUMENTS

| | | | | |
|---|---|---|---|---|
| 7,018,315 B2 * | 3/2006 | Endo | .................... | B60W 10/10 475/120 |
| 7,556,120 B2 * | 7/2009 | Sah | .................... | F16H 61/0031 180/305 |
| 7,779,958 B2 * | 8/2010 | Kitano | ................ | F16H 61/0031 180/338 |
| 7,951,043 B2 * | 5/2011 | Reisch | ................ | F16H 57/0434 192/113.3 |
| 8,167,773 B2 * | 5/2012 | Kothari | ................ | B60W 10/08 180/65.265 |
| 8,371,823 B2 * | 2/2013 | Lee | .................... | F04B 49/06 417/44.1 |
| 8,528,676 B2 * | 9/2013 | Endo | .................... | B60W 10/115 903/917 |
| 8,632,438 B2 * | 1/2014 | Kuroda | .................... | B60K 6/48 477/5 |
| 8,747,074 B2 * | 6/2014 | Jeong | .................... | F04B 35/04 417/16 |
| 8,868,277 B2 * | 10/2014 | Nishimine | ........ | B60W 30/1843 180/65.265 |
| 8,912,691 B2 * | 12/2014 | Miyamoto | .............. | F16K 15/00 137/511 |
| 9,074,570 B2 * | 7/2015 | Kim | .................... | B60W 20/10 |
| 9,109,692 B2 * | 8/2015 | Jeong | .................... | F04B 49/20 |
| 9,140,337 B2 * | 9/2015 | Sah | .................... | B60W 10/06 |
| 9,228,655 B2 * | 1/2016 | Wakairo | .............. | F16H 61/0025 |
| 9,284,882 B2 * | 3/2016 | Kasuya | .................... | B60K 6/26 |
| 9,382,953 B2 * | 7/2016 | Kuwahara | .............. | F16D 48/02 |
| 9,475,490 B2 * | 10/2016 | Youn | .................... | B60W 10/08 |
| 9,528,404 B2 * | 12/2016 | Kimura | .................. | F01M 11/10 |
| 9,744,966 B2 * | 8/2017 | Ouchi | .................... | B60K 6/54 |
| 10,012,308 B2 * | 7/2018 | Song | .................... | F16H 61/0031 |
| 10,295,052 B2 * | 5/2019 | Tsukizaki | ................ | F01M 1/02 |
| 10,919,518 B2 * | 2/2021 | Meyer | .................... | B60W 30/19 |
| 11,603,779 B2 * | 3/2023 | Saga | .................... | F16N 13/20 |
| 11,614,023 B2 * | 3/2023 | Kumar | .................... | F16K 11/076 123/41.09 |
| 11,619,185 B1 * | 4/2023 | Perez | .................... | B60L 50/10 701/22 |
| 11,635,015 B2 * | 4/2023 | Stephens | ................ | F01N 3/0828 123/41.08 |
| 11,635,261 B2 * | 4/2023 | Hall | ........................ | B60H 1/08 165/165 |
| 2009/0118878 A1 * | 5/2009 | Park | .................... | B60L 15/2054 701/22 |

* cited by examiner

COOLING SYSTEM AND METHOD FOR HYBRID ELECTRIC VEHICLE

CROSS REFERENCE TO RELATED APPLICATIONS

This application claims the benefit of priority to Korean Patent Application No. 10-2020-0070348, filed in the Korean Intellectual Property Office on Jun. 10, 2020, the entire contents of which are incorporated herein by reference.

TECHNICAL FIELD

The present disclosure relates to a cooling system and method of a hybrid electric vehicle (HEV) for cooling an engine clutch and a motor in a HEV.

BACKGROUND

When the driving of a motor does not satisfy the required power of a driver in Transmission Mounted Electric Device (TMED)-type HEV and Plug-in Hybrid Electric Vehicle (PHEV), the driver's demand is satisfied using the engine driving force by an engine clutch slip. However, the temperature of an engine clutch increases due to a slip; when the temperature increases to the limit temperature, the slip control may not be maintained anymore. Furthermore, the temperature of the motor may increase in a high temperature environment such as a desert due to the increase in the use of a driving motor in the PHEV; at this time, the driving force needs to be restrictively used to protect the motor even though the battery is sufficient. Accordingly, the optimal cooling can be made by monitoring the temperature of an engine clutch and the temperature of a motor.

SUMMARY

The present disclosure has been made to solve the above-mentioned problems occurring in the prior art while advantages achieved by the prior art are maintained intact.

An aspect of the present disclosure provides a cooling system and method of a HEV that independently adjusts a coolant amount for an engine clutch and a motor based on the temperature of an engine clutch and the temperature of a motor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a cooling system of a hybrid electric vehicle (HEV) includes an electronic oil pump (EOP) for pumping oil from an oil pan, a flow regulating valve for adjusting a coolant amount supplied to an engine clutch and a motor in the EOP, and a controller that determines whether to adjust a coolant amount, based on a temperature of the engine clutch and a temperature of the motor, accelerates a motor of the EOP based on at least one of an automatic transmission fluid (ATF) temperature, an engine clutch temperature, a motor temperature, or a temperature management module (TMM) control mode, and controls the flow regulating valve depending on a motor speed of the EOP to adjust the coolant amount supplied from the EOP to the engine clutch and the motor.

The controller adjusts the coolant amount when the engine clutch temperature exceeds a first reference clutch temperature in a state where the flow regulating valve is turned off.

The controller determines whether the motor temperature exceeds a first reference motor temperature and exceeds a sum of the ATF temperature and a delta-on temperature in a state where the flow regulating valve is turned off.

The controller determines not to adjust the coolant amount when the engine clutch temperature is not greater than a second reference clutch temperature and the motor temperature is not greater than a second reference motor temperature and is not greater than a sum of the ATF temperature and a delta-off temperature, in a state where the flow regulating valve is turned on.

The controller adjusts the coolant amount when the engine clutch temperature exceeds the second reference clutch temperature.

The controller adjusts the coolant amount when the motor temperature exceeds the second reference motor temperature or exceeds the sum of the ATF temperature and the delta-off temperature.

The controller determines an EOP target speed, based on at least one of the ATF temperature, the engine clutch temperature, the motor temperature, or the TMM control mode.

The controller determines whether a lubricant amount supplied by the EOP exceeds a lubricant amount necessary for a transmission.

The controller determines whether the motor speed of the EOP is within a reference range based on the EOP target speed, and turns on the flow regulating valve to increase the coolant amount supplied to the engine clutch and the motor when the motor speed of the EOP is within the reference range.

The controller turns off the flow regulating valve not to increase the coolant amount supplied to the engine clutch and the motor when the motor speed of the EOP is out of the reference range.

According to an aspect of the present disclosure, a cooling method of a HEV includes determining whether to adjust a coolant amount, based on a temperature of an engine clutch and a temperature of a motor, accelerating a motor of an EOP based on at least one of an ATF temperature, an engine clutch temperature, a motor temperature, or a TMM control mode when it is determined that the coolant amount is adjusted, and controlling a flow regulating valve depending on a motor speed of the EOP to adjust the coolant amount supplied from the EOP to the engine clutch and the motor.

The determining of whether to adjust the coolant amount includes determining to adjust the coolant amount when the engine clutch temperature exceeds a first reference clutch temperature in a state where the flow regulating valve is turned off.

The determining of whether to adjust the coolant amount includes determining whether the motor temperature exceeds a first reference motor temperature and exceeds a sum of the ATF temperature and a delta-on temperature in a state where the flow regulating valve is turned off.

The determining of whether to adjust the coolant amount includes determining not to adjust the coolant amount when the engine clutch temperature is not greater than a second reference clutch temperature and the motor temperature is not greater than a second reference motor temperature and is not greater than a sum of the ATF temperature and a delta-off temperature, in a state where the flow regulating valve is turned on.

The determining of whether to adjust the coolant amount further includes determining to adjust the coolant amount when the engine clutch temperature exceeds the second reference clutch temperature.

The determining of whether to adjust the coolant amount further includes determining to adjust the coolant amount when the motor temperature exceeds the second reference motor temperature or exceeds the sum of the ATF temperature and the delta-off temperature.

The accelerating of the motor of the EOP includes determining an EOP target speed, based on at least one of the ATF temperature, the engine clutch temperature, the motor temperature, or the TMM control mode.

The accelerating of the motor of the EOP further includes determining whether a lubricant amount supplied by the EOP exceeds a lubricant amount necessary for a transmission.

The adjusting of the coolant amount includes determining whether the motor speed of the EOP is within a reference range based on the EOP target speed and turning on the flow regulating valve to increase the coolant amount supplied to the engine clutch and the motor when the motor speed of the EOP is within the reference range.

The adjusting of the coolant amount further includes turning off the flow regulating valve not to increase the coolant amount supplied to the engine clutch and the motor when the motor speed of the EOP is out of the reference range.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
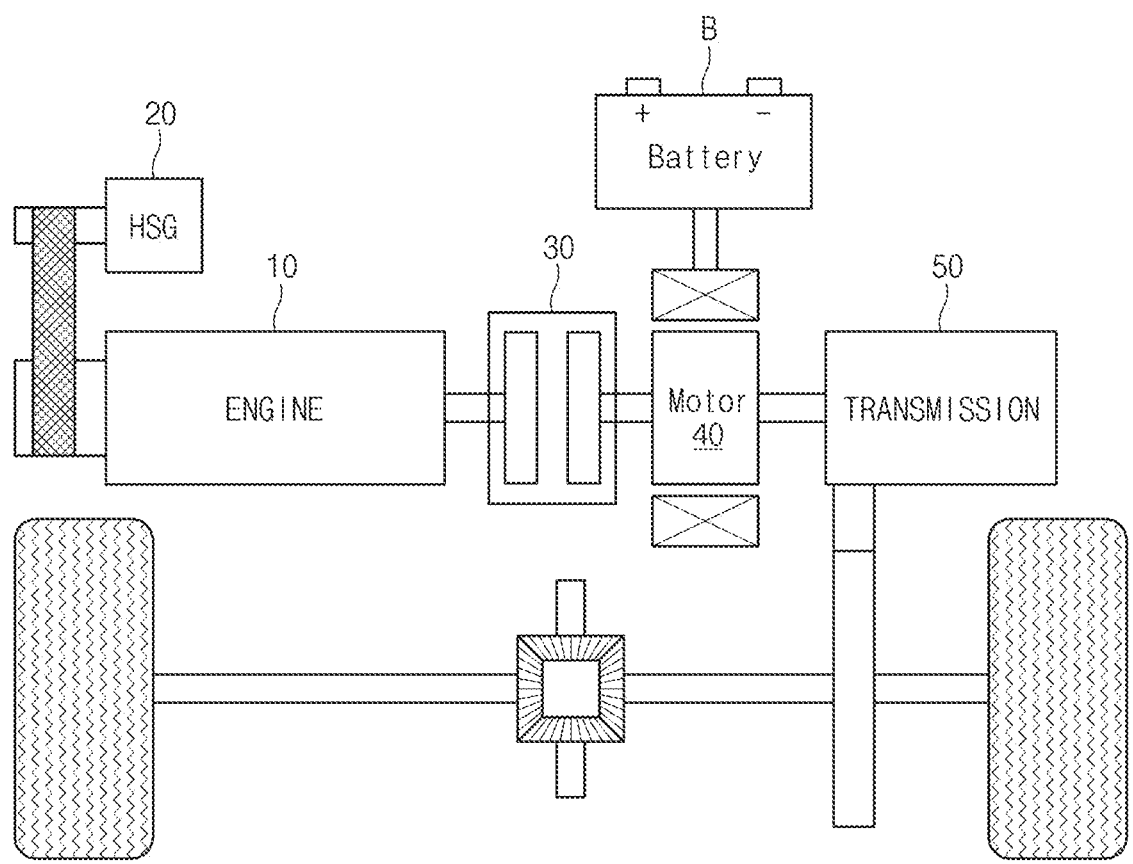
FIG. 1 is a block diagram illustrating a HEV associated with the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a HEV associated with the present disclosure.

Referring to FIG. 1, the HEV includes an engine 10, a hybrid starter generator (HSG) 20, an engine clutch 30, a motor 40, and a transmission 50. Herein, the HEV may be a TMED-type HEV and/or PHEV.

The engine 10 burns fuel to generate power (engine torque) required to drive a vehicle. Various engines known as a gasoline engine, a diesel engine, or the like may be used as the engine 10. The engine 10 controls the output torque (i.e., engine torque) depending on the command of the engine management system (EMS).

The HSG 20 may be mounted on the engine 10 and may start by cranking the engine 10. The HSG 20 may generate electric energy by operating as a generator in a state where the engine 10 is started. The electrical energy generated by the HSG 20 may be used to charge a battery 'B'.

The engine clutch 30 is interposed between the engine 10 and the motor 40 to engage or disengage the power (output torque) of the engine 10. The engine clutch 30 delivers or blocks the power (engine torque) generated by the engine 10 to the driving wheel (vehicle wheel) through engagement or disengagement.

The motor 40 receives power from the battery 'B' to generate power (motor power) and then delivers the motor power to the driving wheel. The motor 40 controls the output torque (motor torque) of the motor 40 by changing the rotation direction and Revolution Per Minute (RPM) depending on the instructions of the motor control unit (MCU). The motor 40 may be used as a generator that charges the battery 'B' by generating reverse electromotive force when state of charge (SOC) is insufficient or during regenerative braking. The battery 'B' supplies the power required to drive the vehicle, and is implemented with a high voltage battery. A power converter (not illustrated) may be interposed between the motor 40 and the battery 'B'. The power converter (not illustrated) converts and supplies the voltage output from a vehicle battery (not illustrated) into a motor driving voltage. The battery 'B' may be charged by the regenerative energy generated by the motor 40.

The transmission 50 converts and outputs the motor torque or the engine torque and the motor torque at the transmission ratio matched with a shifting gear. The transmission 50 may be implemented with a double clutch transmission (DCT). The transmission 50 changes the shifting gear depending on the instructions of a Transmission Control Unit (TCU). The TCU may determine an optimal shifting gear based on information about a vehicle's driving speed (i.e., a vehicle speed or a wheel speed), accelerator pedal position, engine rotation speed, and/or clutch travel, through sensors in the vehicle.

Figure 2:
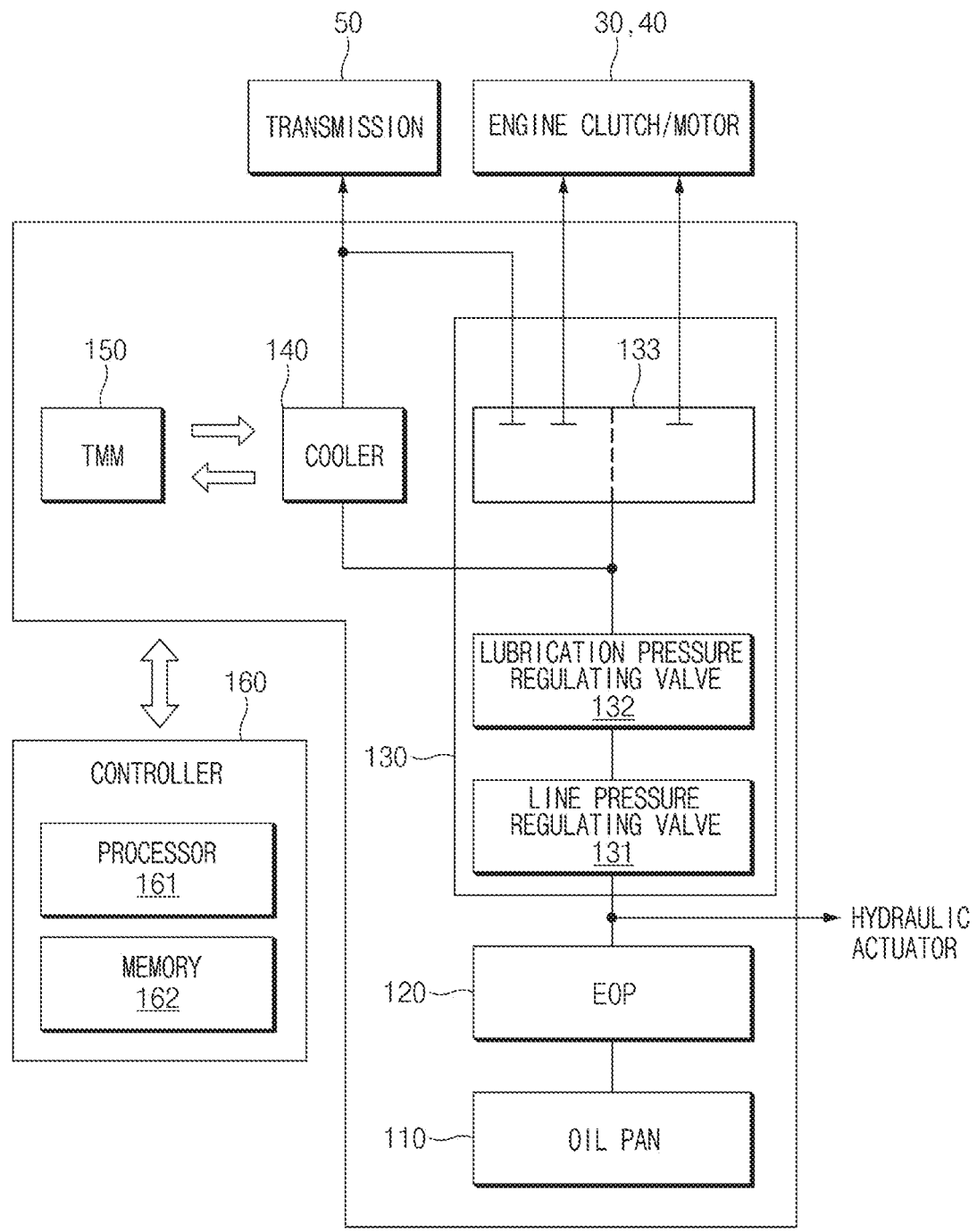
FIG. 2 is a block diagram illustrating a cooling system of a HEV according to an embodiment of the present disclosure.
Figure 3:
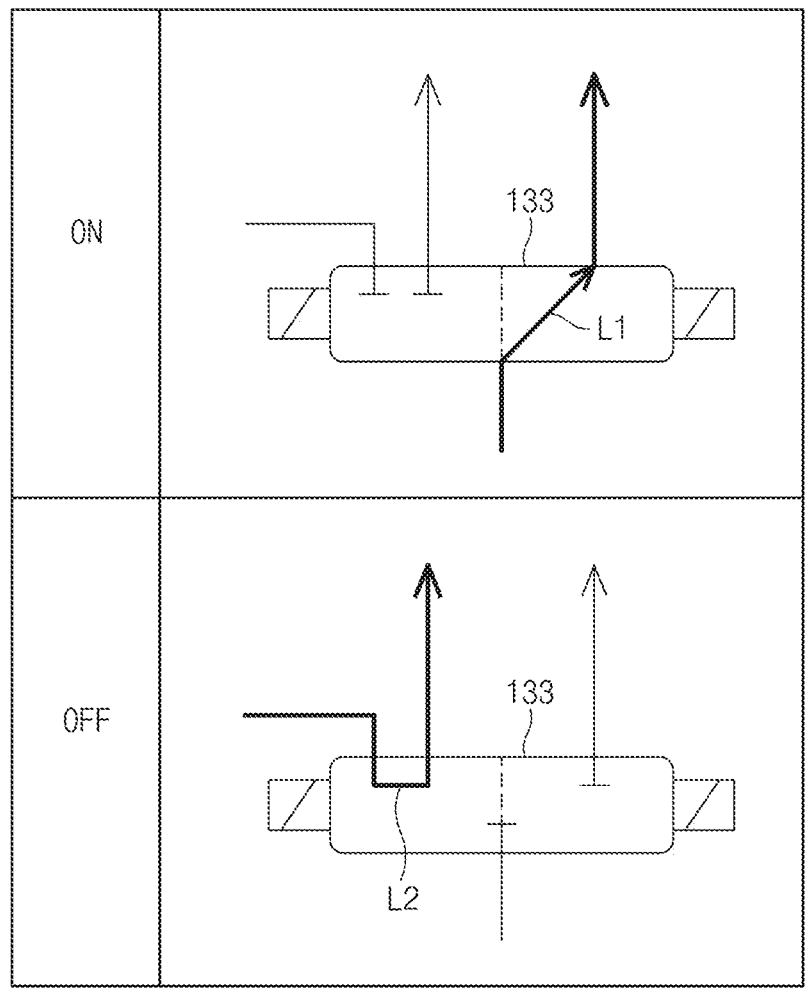
FIG. 3 is a view for describing an operating mode of a lubricant amount control valve disclosed in FIG. 2.
Figure 4:
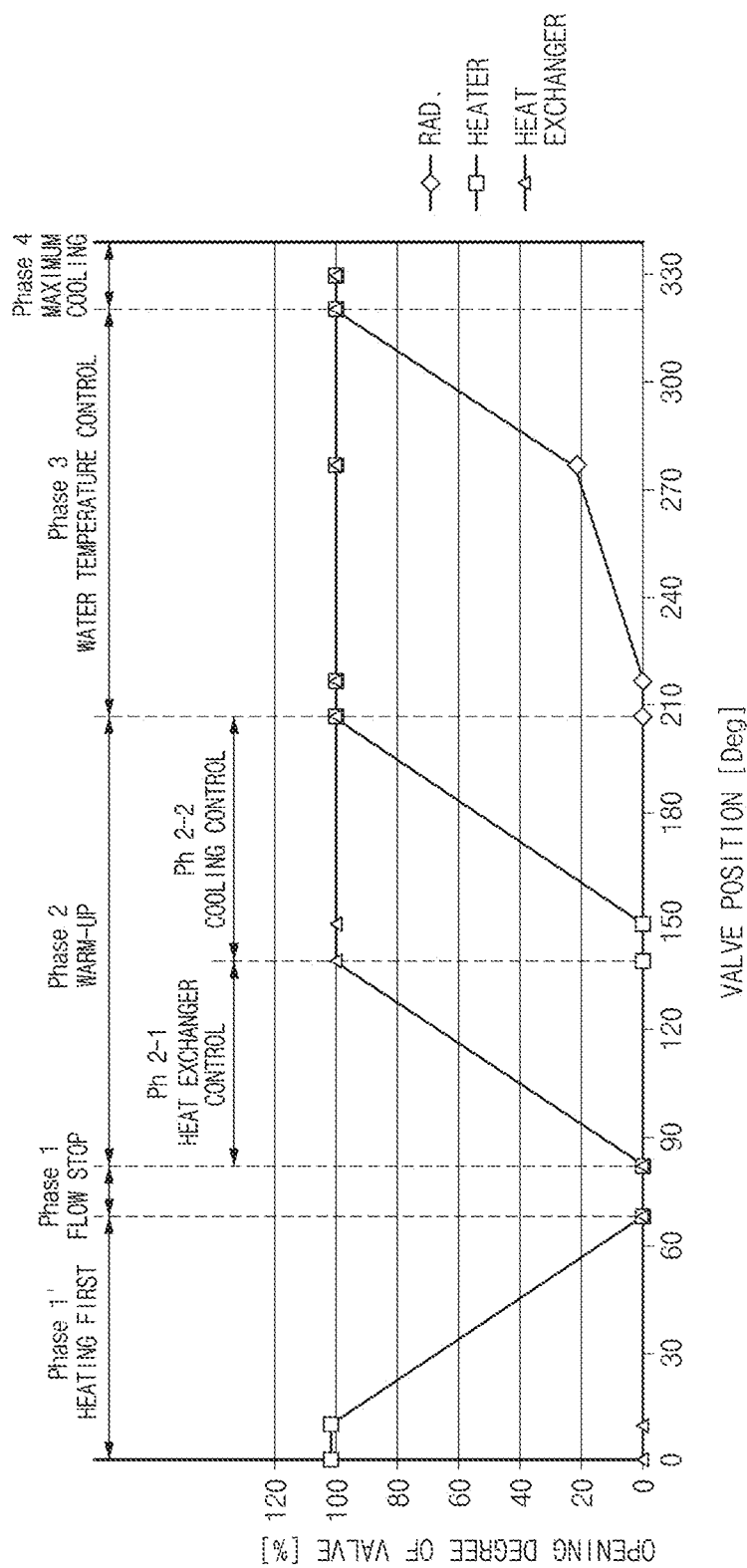
FIG. 4 is a graph illustrating a control example of an opening degree of an integrated valve of a TMM according to an embodiment of the present disclosure.

FIG. 2 is a block diagram illustrating a cooling system of a HEV according to an embodiment of the present disclosure. FIG. 3 is a view for describing an operating mode of a lubricant amount control valve disclosed in FIG. 2. FIG. 4 is a graph illustrating a control example of an opening degree of an integrated valve of a TMM according to an embodiment of the present disclosure.

Referring to FIG. 2, a cooling system includes an oil pan 110, an Electronic Oil Pump (EOP) 120, a valve body 130, a cooler 140, a Temperature Management Module (TMM) 150, and a controller 160.

The oil pan 110 stores oil (e.g., lubricant and/or coolant). An oil supply line may be connected to the outlet end of the oil pan 110. The oil stored in the oil pan 110 may be supplied to the engine clutch 30, the motor 40, and the transmission 50 through an oil supply line.

The EOP 120 circulates and supplies oil for providing the transmission 50 with oil pressure and lubrication. In the present embodiment, an embodiment is exemplified as the EOP 120 is applied as an oil pump, but an embodiment is not limited thereto; the oil pump may be implemented with a mechanical oil pump.

A line pressure flow path for forming a line pressure is formed on the downstream side of the EOP 120. The line pressure flow path is branched into a plurality of flow paths to supply control pressure to the plurality of hydraulic actuators. Herein, a hydraulic actuator may be a device using the pressure of the fluid, and may be an engine clutch and/or a brake.

The valve body 130 may be disposed at the downstream side of the EOP 120, and may include a line pressure regulating valve 131, a lubrication pressure regulating valve 132, and a flow regulating valve 133. Each valve 131, 132, or 133 may be implemented with a solenoid valve.

The line pressure regulating valve 131 may be installed in the line pressure flow path at the downstream side of the EOP 120. The line pressure regulating valve 131 may control the pressure of the oil supplied by the EOP 120. A lubrication line may be connected to the line pressure regulating valve 131; lubricant oil (lubricant) may be supplied to the engine clutch 30 and the transmission 50 through the lubrication line.

The lubrication pressure regulating valve 132 is installed in the lubrication line to control the pressure of the lubricant supplied from the line pressure regulating valve 131. The first coolant line that is branched from a lubrication line and connected to the engine clutch 30 and the motor 40 may be disposed on the downstream side of the lubrication pressure regulating valve 132.

The flow regulating valve 133 may be installed on the first coolant line to control the flow amount of cooling oil (coolant) supplied to the engine clutch 30 and the motor 40. The flow regulating valve 133 may be a valve operating independently; the internal flow path may be switched depending on an operating state of the valve, that is, on or off.

Referring to FIG. 3, when the flow regulating valve 133 is turned on, the coolant supplied through the first coolant line may be supplied to the engine clutch 30 and the motor 40 through the first internal flow path L1. When the flow regulating valve 133 is turned off, the coolant supplied through the first coolant line may be supplied to the engine clutch 30 and the motor 40 through the second internal flow path L2. The first internal flow path may supply more flow amount than the second internal flow path.

The cooler 140 is installed in a lubrication line connected to the downstream side of the lubrication pressure regulating valve 132 to cool the circulated oil. The oil cooled in the cooler 140, that is, the lubricant may be supplied to the transmission 50 through a lubrication line connected to the outlet end of the cooler 140. The second coolant line that is branched from the lubrication line connected to the outlet end of the cooler 140 and connected to the engine clutch 30 and the motor 40 may be disposed. A part of the lubricant supplied from the cooler 140 to the transmission 50 may be supplied through the second coolant line as the coolant of the engine clutch 30 and the motor 40. At this time, the ratio of the lubricant supplied to the transmission 50 to the coolant supplied to the engine clutch 30 and the motor 40 may be determined in advance.

The TMM 150 is a device for collectively controlling the amount of coolant supplied to the cooler 140, an exhaust heat retrieving device, a radiator, a heat exchanger, and/or a heater. The TMM 150 may adjust the opening degree of the integrated valve and may distribute and supply the engine coolant depending on the adjusted opening degree. As illustrated in FIG. 4, the TMM 150 may collectively control the opening degree of a valve matched with each of a radiator, a heater, and a heat exchanger depending on a control mode to control the amount of coolant supplied to each of the radiator, the heater, and the heat exchanger.

The controller 160 may include at least one processor 161 and memory 162. The processor 161 may be a semiconductor device that processes instructions stored in the memory 162. The processor 161 may be implemented with an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and/or microprocessors. The memory 162 may include various kinds of volatile (transitory) or non-volatile (non-transitory) storage media. For example, the memory 162 may include storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a cache, and/or a removable disc.

The controller 160 determines whether a cooling control activation condition is satisfied. The controller 160 may determine whether to diagnose a Transmission Control Unit (TCU), and may determine a cooling control operation depending on the result of the determination. For example, when TCU diagnosis is unnecessary, the controller 160 may determine the cooling control operation; when TCU diagnosis is necessary due to the abnormality of clutch hydraulic, or the like, the controller 160 may determine that cooling control is inactive.

When satisfying the cooling control activation condition, the controller 160 determines the state of the flow regulating valve 133. The controller 160 determines whether the flow regulating valve 133 is turned on or off.

When the flow regulating valve 133 is turned off, the controller 160 identifies the engine clutch temperature and motor temperature. The controller 160 may obtain the engine clutch temperature and the motor temperature through sensors (not illustrated) respectively mounted on the engine clutch 30 and the motor 40.

The controller 160 determines whether the engine clutch temperature and the motor temperature satisfy the first condition. The first condition may be defined as a case where the engine clutch temperature exceeds the first reference clutch temperature or a case where the motor temperature exceeds the first reference motor temperature and exceeds the sum of the oil (Automatic Transmission Fluid (ATF)) temperature and a delta-on temperature. Herein, the first reference clutch temperature is the engine clutch temperature that is the basis for determining that the flow regulating valve 133 is turned on. The first reference motor temperature is the motor temperature that is the basis for determining that the flow regulating valve 133 is turned on. The first reference clutch temperature and the first reference motor temperature may be set in advance by the system designer based on the experimental values. The ATF temperature may be measured through a sensor, as the current temperature of the coolant supplied to the engine clutch 30 and the motor 40. The delta-on temperature is the constant value determined in advance by the system designer.

When the engine clutch temperature and motor temperature satisfy the first condition, the controller 160 determines whether the lubricant amount (hereinafter, an EOP supply lubricant amount) supplied by the EOP 120 exceeds the lubricant amount (hereinafter, a transmission-required lubricant amount) required for normal operation of the transmission 50. The transmission 50 may be protected from failure due to insufficient lubricant amount, by securing the lubricant amount supplied to the transmission 50 without supplying an additional coolant amount to the engine clutch 30 and the motor 40 when the EOP supply lubricant amount is insufficient.

The controller 160 increases the EOP speed when the EOP supply lubricant amount exceeds the transmission-required lubricant amount. The controller 160 may determine the target speed (hereinafter, EOP target speed) of the motor of the EOP 120, based on at least one of the motor temperature, the engine clutch temperature, the ATF temperature, or a TMM control mode. The EOP target speed refers to the motor speed of the EOP 120 when the flow regulating valve 133 is turned on.

The controller 160 may determine the EOP target speed, using Equation 1 below.

$$\text{EOP target speed} = \text{Min}(\text{EOP}_{ATF}, \text{EOP}_{motor}, \text{EOP}_{engine\_clutch}) * \text{EOP}_{TMM} \quad \text{Equation 1}$$

Herein, $\text{EOP}_{ATF}$ denotes an EOP target speed according to ATF temperature; $\text{EOP}_{motor}$ denotes the EOP target speed according to the motor temperature; $\text{EOP}_{engine\_clutch}$ denotes the EOP target speed according to the engine clutch temperature; $\text{EOP}_{TMM}$ denotes a weight according to the TMM control mode. The controller 160 may determine $\text{EOP}_{ATF}$, $\text{EOP}_{motor}$, $\text{EOP}_{engine\_clutch}$, and $\text{EOP}_{TMM}$ with reference to maps stored in the memory 162, such as Table 1, Table 2, Table 3, and Table 4.

TABLE 1

| | ATF temperature | | | | | | | |
|---|---|---|---|---|---|---|---|---|
| | −30° C. | 0° C. | 60° C. | 120° C. | 140° C. | 150° C. | 160° C. | 170° C. |
| $\text{EOP}_{ATF}$ [rpm] | 600 | 1000 | 1500 | 2800 | 3400 | Max | Max | Max |

TABLE 2

| | Motor temperature | | | | | | | |
|---|---|---|---|---|---|---|---|---|
| | −30° C. | 0° C. | 60° C. | 120° C. | 140° C. | 150° C. | 160° C. | 170° C. |
| $\text{EOP}_{motor}$ [rpm] | 600 | 1000 | 1500 | 2800 | 3000 | 3200 | 3400 | Max |

TABLE 3

| | Engine clutch temperature | | | | | | | |
|---|---|---|---|---|---|---|---|---|
| | −30° C. | 0° C. | 60° C. | 120° C. | 140° C. | 170° C. | 200° C. | 230° C. |
| $\text{EOP}_{engine\_clutch}$ [rpm] | 600 | 1000 | 1500 | 2800 | 3400 | Max | Max | Max |

TABLE 4

| TMM control mode | Heating first | Flow stop | Warm-up | Water temperature control | Maximum cooling |
|---|---|---|---|---|---|
| $\text{EOP}_{TMM}$ | 1 | 1 | 1 | 1.1 | 1 |

The controller 160 transmits the determined EOP target speed to the EOP 120. The EOP 120 accelerates the motor of the EOP 120 depending on the command of the controller 160. The controller 160 determines whether the motor speed (hereinafter, EOP speed) of the EOP 120 is within a reference range. The controller 160 determines whether the EOP speed is not less than "EOP target speed−lower limit speed" and less than "EOP target speed+upper limit speed".

The controller 160 turns on the flow regulating valve 133 when the EOP speed is within the reference range. The controller 160 turns off the flow regulating valve 133 when the EOP speed is out of reference range.

When the engine clutch temperature and the motor temperature do not satisfy the first condition, the controller 160 determines whether the engine clutch temperature and the motor temperature satisfy the second condition. The second condition may be defined as a case where the engine clutch temperature is not greater than the second reference clutch temperature and the motor temperature is not greater than the second reference motor temperature and is not greater than the sum of the ATF temperature and a delta-off temperature. Herein, the second reference clutch temperature is the engine clutch temperature that is the basis for determining that the flow regulating valve 133 is turned off. The second reference motor temperature is the motor temperature that is the basis for determining that the flow regulating valve 133 is turned off. The second reference clutch temperature and the second reference motor temperature may be set in advance by the system designer. The ATF temperature may be measured through a sensor, as the current temperature of the coolant supplied to the engine clutch 30 and the motor 40. The delta-off temperature is the constant value determined in advance by the system designer.

When the engine clutch temperature and motor temperature satisfy the second condition, the controller 160 does not increase the EOP speed. Besides, when the flow regulating valve 133 is turned on, the controller 160 switches the flow regulating valve 133 to be in an off state.

When the engine clutch temperature and motor temperature do not satisfy the second condition, the controller 160 compares the EOP supply lubricant amount with the transmission-required lubricant amount, and determines whether to increase the EOP speed based on the comparison result. Furthermore, the controller 160 does not increase the EOP speed when the EOP supply lubrication amount is not greater than the transmission required lubrication amount.

When the controller 160 increases the coolant amount supplied to the engine clutch 30 and the motor 40 by increasing the EOP speed, the controller 160 may measure the coolant amount actually supplied to the engine clutch 30 and the motor 40, using a sensor. The controller 160 may compare the measured coolant amount with the coolant amount matched with the EOP target speed; when the comparison result indicates that there is a difference not less than an error range, the controller 160 may correct the EOP target speed in consideration of the difference.

Figure 5:
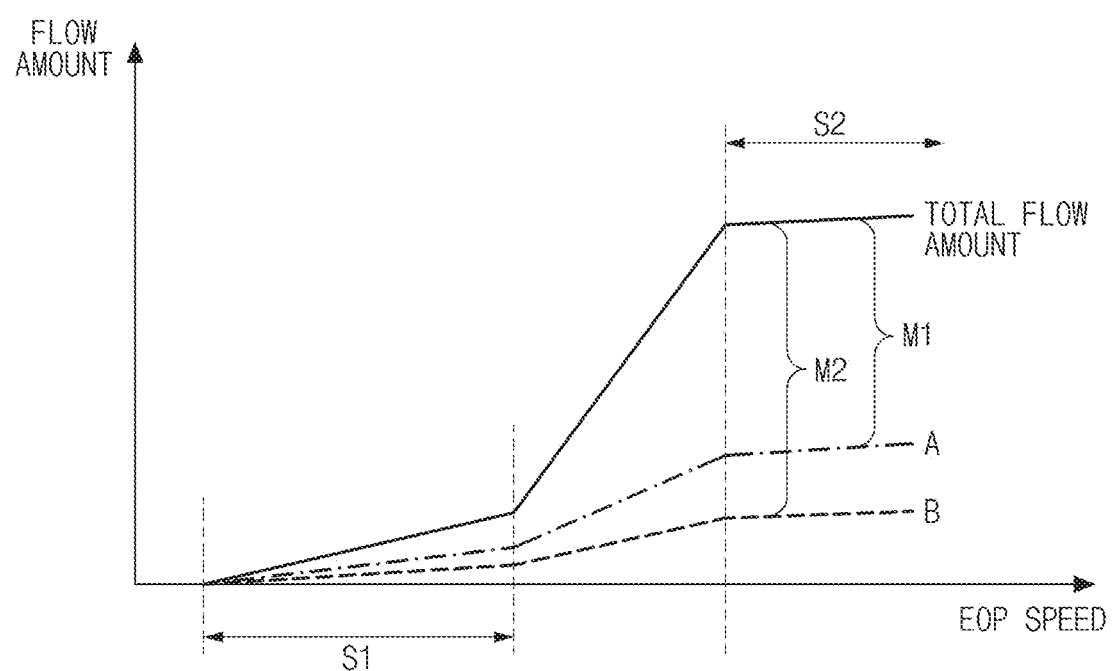
FIG. 5 is a graph illustrating a coolant amount according to an EOP speed according to an embodiment of the present disclosure.

FIG. 5 is a graph illustrating a coolant amount according to an EOP speed according to an embodiment of the present disclosure.

Referring to FIG. 5, in a state where the flow regulating valve 133 is turned on, the coolant amount supplied to the engine clutch 30 and the motor 40 may be changed depending on the EOP speed, like 'A'. In a state where the flow regulating valve 133 is turned off, the coolant amount may be changed depending on the EOP speed, like 'B'. Accordingly, as the flow regulating valve 133 is turned on, the additional coolant amount may be secured as much as the difference between 'A' and line 'B'. When the coolant amount is changed depending on the on and off state of the flow regulating valve 133, the lubricant amount supplied to the transmission 50 may be changed. For example, when the flow regulating valve 133 is turned on, the lubricant amount supplied to the transmission 50 is equal to M1; when the flow regulating valve 133 is turned off, the lubricant amount supplied to the transmission 50 is equal to M2. In other words, as the state of the flow regulating valve 133 is switched from the off state to the on state, the lubricant amount supplied to the transmission 50 is reduced by the added coolant amount (the difference between A and B).

The flow amount supplied for lubrication and cooling of the engine clutch 30, the motor 40, and the transmission 50 is determined by the EOP speed. At this time, the oil is not supplied to the engine clutch 30, the motor 40, and the transmission 50 until the total flow amount supplied for lubrication and cooling of the engine clutch 30, the motor 40, and the transmission 50 exceeds a threshold flow amount required to supply the control pressure required to operate a hydraulic actuator. That is, in the control pressure use region S1, the oil supplied by the EOP 120 is used to supply the control pressure required for the operation of the hydraulic actuator. When the flow amount supplied by the EOP 120 exceeds the threshold flow amount, the controller 160 manipulates each valve of the valve body 130, distributes the flow amount supplied by the EOP 120, and supplies the distributed flow amount to the engine clutch 30, the motor 40 and the transmission 50. At this time, the total flow amount supplied to the engine clutch 30, the motor 40, and the transmission 50 reaches the threshold EOP speed, the total flow amount enters the flow amount saturation region S2 where an increment is slow.

Figure 6:
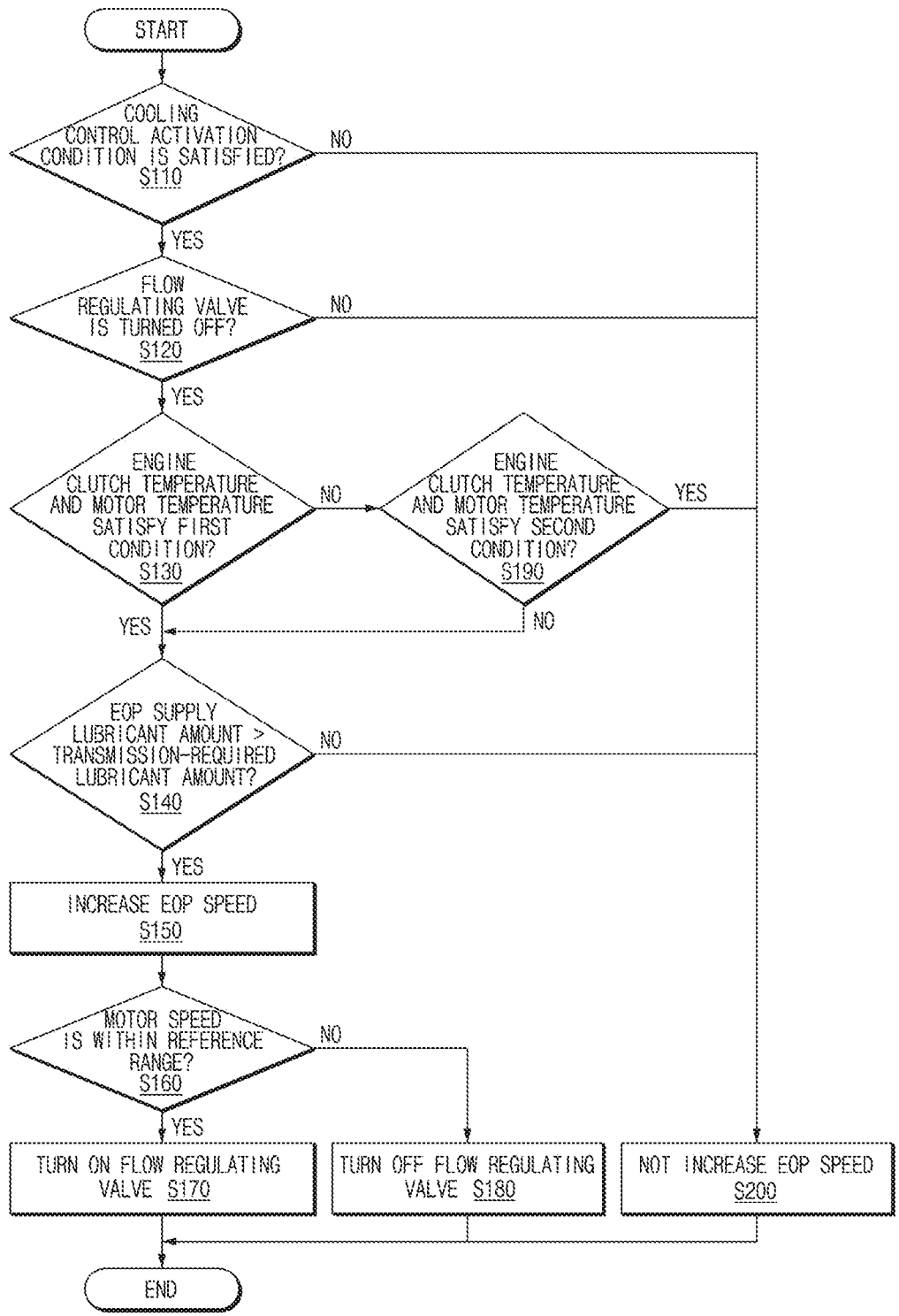
FIG. 6 is a flowchart illustrating a cooling method of a HEV according to an embodiment of the present disclosure.

FIG. 6 is a flowchart illustrating a cooling method of a HEV according to an embodiment of the present disclosure.

Referring to FIG. 6, the controller 160 determines whether a cooling control activation condition is satisfied at S110. The controller 160 may determine whether to diagnose a Transmission Control Unit (TCU), and may determine a cooling control operation depending on the determination result.

When satisfying the cooling control activation condition, the controller 160 determines whether the flow regulating valve 133 is turned off at S120. That is, the controller 160 may identify the operating state of the flow regulating valve 133 to determine whether the EOP speed is increased (while cooling control is operated).

When the flow regulating valve 133 is turned off, the controller 160 determines whether the engine clutch temperature and the motor temperature satisfy the first condition at S130. The controller 160 may obtain the engine clutch temperature and the motor temperature through sensors (not illustrated) respectively mounted on the engine clutch 30 and the motor 40. The controller 160 determines whether the engine clutch temperature exceeds the first reference clutch temperature or whether the motor temperature exceeds the first reference motor temperature and exceeds the sum of the oil (ATF) temperature and a delta-on temperature. Herein, the first reference clutch temperature is the engine clutch temperature that is the basis for determining that the flow regulating valve 133 is turned on. The first reference motor temperature is the motor temperature that is the basis for determining that the flow regulating valve 133 is turned on. The first reference clutch temperature and the first reference motor temperature may be set in advance by the system designer based on the experimental values. The ATF temperature may be measured through a sensor, as the current temperature of the coolant supplied to the engine clutch 30 and the motor 40. The delta-on temperature is the constant value determined in advance by the system designer.

When the engine clutch temperature and the motor temperature satisfy the first condition, the controller 160 determines whether an EOP supply lubricant amount exceeds a transmission-required lubricant amount at S140. It is possible to prevent a problem (e.g., breakage) that may occur due to the lack of the lubricant amount supplied to the transmission 50.

The controller 160 increases the EOP speed when the EOP supply lubricant amount exceeds the transmission-required lubricant amount at S150. The controller 160 may determine the target speed (hereinafter, EOP target speed) of the motor of an EOP, based on at least one of the motor temperature, the engine clutch temperature, the ATF temperature, or a TMM control mode.

The controller 160 determines whether the motor speed of the EOP is within a reference range at S160. The controller 160 determines whether the EOP speed is not less than "EOP target speed−lower limit speed" and less than "EOP target speed+upper limit speed".

The controller 160 turns on the flow regulating valve 133 when the EOP speed is within the reference range at S170. In other words, when the EOP speed reaches the EOP target speed within an error range, the controller 160 may turn on the flow regulating valve 133 to increase the coolant amount supplied to the engine clutch 30 and the motor 40.

The controller 160 turns off the flow regulating valve 133 when the EOP speed is out of a reference range.

When the engine clutch temperature and the motor temperature do not satisfy the first condition in S130, the controller 160 determines whether the engine clutch temperature and the motor temperature satisfy the second condition at S190. The second condition may be defined as a case where the engine clutch temperature is not greater than the second reference clutch temperature and the motor temperature is not greater than the second reference motor temperature and is not greater than the sum of the ATF temperature and a delta-off temperature. Herein, the second reference clutch temperature is the engine clutch temperature that is the basis for determining that the flow regulating valve 133 is turned off. The second reference motor temperature is the motor temperature that is the basis for determining that the flow regulating valve 133 is turned off. The second reference clutch temperature and the second reference motor temperature may be set in advance by the system designer. The ATF temperature may be measured through a sensor, as the current temperature of the coolant supplied to the engine clutch 30 and the motor 40. The delta-off temperature is the constant value determined in advance by the system designer.

When the engine clutch temperature and motor temperature satisfy the second condition, the controller 160 does not increase the EOP speed at S200. Besides, the controller 160 turns off the flow regulating valve 133.

In S190, when the engine clutch temperature and the motor temperature do not satisfy the second condition, the controller 160 performs S140 and steps after S140. When the engine clutch temperature and motor temperature do not satisfy the second condition, the controller 160 compares the EOP supply lubricant amount with the transmission-required lubricant amount, and determines whether to increase the EOP speed, depending on the comparison result; the controller 160 may or may not increase the EOP speed depending on the determination.

In S140, the controller 160 performs S200 when the EOP supply lubrication amount is not greater than the transmission required lubrication amount. That is, the controller 160 does not increase the EOP speed when the EOP supply lubrication amount is not greater than the transmission required lubrication amount.

Figure 7:
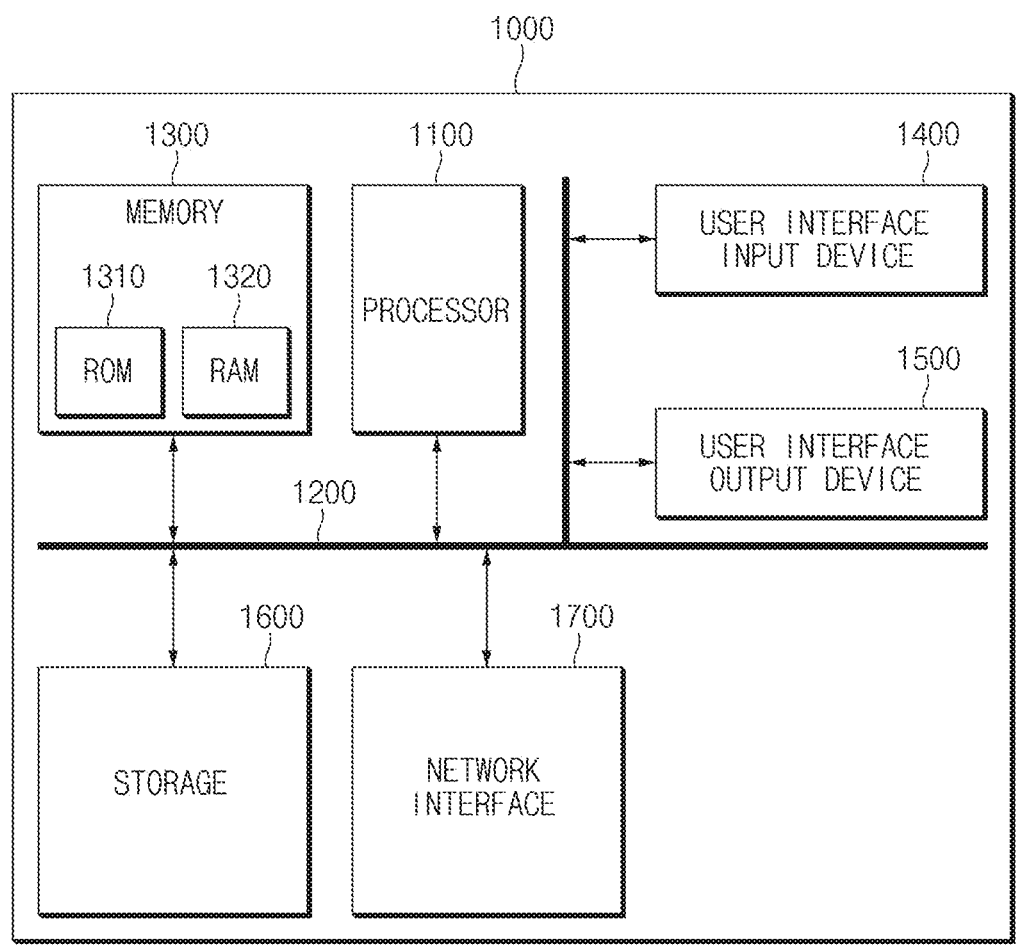
FIG. 7 is a block diagram illustrating a computing system performing a cooling method according to an embodiment of the present disclosure.

FIG. 7 is a block diagram illustrating a computing system performing a cooling method according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an embodiment of the present disclosure, the coolant amount for an engine clutch and a motor is independently adjusted based on the temperature of an engine clutch and the temperature of a motor, thereby improving the system performance by effectively adjusting the temperature of an engine clutch and the temperature of a motor.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A cooling system of a hybrid electric vehicle (HEV), the system comprising:
   an electronic oil pump (EOP) configured to pump oil from an oil pan;

a flow regulating valve configured to adjust an oil amount supplied from the EOP to an engine clutch and a driving motor; and a controller configured to:

determine whether to adjust the oil amount based on a temperature of the engine clutch and a temperature of the driving motor;

accelerate a motor of the EOP based on at least one of an automatic transmission fluid (ATF) temperature, an engine clutch temperature, a motor temperature, or a temperature management module (TMM) control mode; and control the flow regulating valve depending on a motor speed of the EOP to adjust the oil amount supplied from the EOP to the engine clutch and the driving motor.

2. The system of claim 1, wherein the controller adjusts the oil amount when the engine clutch temperature exceeds a first reference clutch temperature in a state where the flow regulating valve is turned off.

3. The system of claim 1, wherein the controller determines whether the motor temperature exceeds a first reference motor temperature, and exceeds a sum of the ATF temperature and a delta-on temperature in a state where the flow regulating valve is turned off.

4. The system of claim 1, wherein the controller determines not to adjust the oil amount when the engine clutch temperature is not greater than a second reference clutch temperature, and the motor temperature is not greater than a second reference motor temperature and is not greater than a sum of the ATF temperature and a delta-off temperature, in a state where the flow regulating valve is turned on.

5. The system of claim 4, wherein the controller adjusts the oil amount when the engine clutch temperature exceeds the second reference clutch temperature.

6. The system of claim 5, wherein the controller adjusts the oil amount when the motor temperature exceeds the second reference motor temperature or exceeds the sum of the ATF temperature and the delta-off temperature.

7. The system of claim 1, wherein the controller determines an EOP target speed based on at least one of the ATF temperature, the engine clutch temperature, the motor temperature, or the TMM control mode.

8. The system of claim 7, wherein the controller determines whether a lubricant amount supplied by the EOP exceeds a lubricant amount required for a transmission.

9. The system of claim 7, wherein the controller determines whether the motor speed of the EOP is within a reference range based on the EOP target speed, and turns on the flow regulating valve to increase the oil amount supplied to the engine clutch and the driving motor when the motor speed of the EOP is within the reference range.

10. The system of claim 9, wherein the controller turns off the flow regulating valve not to increase the oil amount supplied to the engine clutch and the motor when the driving motor speed of the EOP is out of the reference range.

\* \* \* \* \*